United States Patent
Jia et al.

(10) Patent No.: US 7,789,920 B2
(45) Date of Patent: Sep. 7, 2010

(54) SUPERCRITICAL PROCESS, REACTOR AND SYSTEM FOR HYDROGEN PRODUCTION

(75) Inventors: Zhijun Jia, La Crosse, WI (US); Lawrence A. Stryker, La Crescent, MN (US); Douglas Decker, La Crosse, WI (US)

(73) Assignee: Chart Industries, Inc., Garfield Heights, OH (US)

( * ) Notice: Subject to any disclaimer, the term of this patent is extended or adjusted under 35 U.S.C. 154(b) by 0 days.

(21) Appl. No.: 11/784,696

(22) Filed: Apr. 9, 2007

(65) Prior Publication Data

US 2007/0234640 A1 Oct. 11, 2007

Related U.S. Application Data

(60) Provisional application No. 60/790,137, filed on Apr. 7, 2006.

(51) Int. Cl.
*B01J 7/00* (2006.01)
(52) U.S. Cl. .................. 48/61; 48/198.3; 48/197 R; 48/127.9; 48/127.3; 48/198.7; 48/73; 48/99; 48/111; 48/197 A; 48/214 R; 48/214 A; 48/209; 48/210; 48/211; 422/129; 422/187; 422/211; 422/222
(58) Field of Classification Search .......... 422/188–197
See application file for complete search history.

(56) References Cited

U.S. PATENT DOCUMENTS

| | | | |
|---|---|---|---|
| 5,252,224 A | 10/1993 | Modell et al. | |
| 5,401,391 A * | 3/1995 | Collins et al. | 208/208 R |
| 6,083,409 A * | 7/2000 | Lin et al. | 210/758 |
| 6,221,117 B1 * | 4/2001 | Edlund et al. | 48/76 |
| 6,231,831 B1 * | 5/2001 | Autenrieth et al. | 423/648.1 |
| 6,510,894 B1 | 1/2003 | Watton et al. | |
| 6,695,044 B1 | 2/2004 | Symonds | |
| 7,182,917 B2 * | 2/2007 | Krueger | 422/129 |
| 7,527,661 B2 * | 5/2009 | Chellappa et al. | 48/197 R |
| 2003/0105172 A1 * | 6/2003 | Bowe et al. | 518/728 |
| 2005/0003247 A1 * | 1/2005 | Pham | 429/17 |

FOREIGN PATENT DOCUMENTS

| | | |
|---|---|---|
| EP | 1456122 B1 | 9/2004 |
| WO | WO03/051770 A1 | 6/2003 |

* cited by examiner

*Primary Examiner*—Glenn Caldarola
*Assistant Examiner*—Kaity V. Handal
(74) *Attorney, Agent, or Firm*—R. Blake Johnston, Esq.; DLA Piper LLP (US)

(57) ABSTRACT

A reactor, system and method for producing hydrogen features a reactor containing a heating stream channel and a hydrogen channel with a reaction channel positioned there between. A heat transfer sheet separates the heating stream channel and the reaction channel and a porous support plate separates the reaction channel and the hydrogen channel. A membrane constructed from palladium, vanadium, copper or alloys thereof covers the porous support plate. The heating stream channel receives a heating stream so that heat is provided to the reaction channel through the heat transfer sheet. A catalyst is positioned in the reaction channel and the reaction channel receives a reaction stream including a mixture of supercritical water and a hydrocarbon fuel so that hydrogen is produced in the reaction channel and is passed through the membrane into the hydrogen channel. The hydrogen separation may alternatively be accomplished in a separator device distinct from the reactor via either a membrane or pressure swing adsorption.

24 Claims, 6 Drawing Sheets

SUPERCRITICAL PROCESS, REACTOR AND SYSTEM FOR HYDROGEN PRODUCTION

CLAIM OF PRIORITY

This application claims priority from U.S. Provisional Patent Application Ser. No. 60/790,137, filed Apr. 7, 2006

TECHNICAL FIELD

The present invention relates generally to hydrogen production and, more particularly, to a process utilizing supercritical water and hydrocarbon sources and an associated reactor and system for generating hydrogen.

BACKGROUND

Hydrogen is required as an input for a variety of processes and various technologies. Examples of such processes and technologies include hydrogenation, ammonia synthesis and fuel cells.

Water is the most prevalent substance from which hydrogen may be obtained. Methane steam reforming (MSR), however, is the only prior art technology economically operable and commercially available for obtaining hydrogen from water. The MSR process, which requires a source of methane or natural gas, is a costly and complex one. For MSR, thermal control at high temperatures (such as above 800° C.) and catalyst deactivation are both technically difficult areas. A need therefore exists for an economical system and method whereby hydrogen may be obtained from water using a process other than the MSR process.

Electrochemical extraction of energy from hydrogen via fuel cells is an especially clean and efficient method of providing power. As a result, fuel cell development is very active for various applications. An example of such an application is powering automobiles. Governmental requirements regarding the maximum allowable harmful fuel emissions for vehicles in the United States are forcing vehicle manufacturers to design vehicles that run on fuels other than gasoline and diesel fuel or consider alternative types of engines, such as electric engines. This has led to the design of vehicles that use fuel cells that run on pure hydrogen. When pure hydrogen is mixed with oxygen via a fuel cell in the vehicle, water, heat and electricity are produced, ideally without emitting other chemicals that are harmful to the air or the environment.

In addition, a fuel cell system running on hydrogen can be compact, lightweight and has no major moving parts. Because fuel cells have no moving parts, in ideal conditions they can achieve a very high reliability with minimal downtime. As a result, fuel cells are also very useful as power sources in remote locations, such as spacecraft, remote weather stations, large parks, rural locations and in certain military applications.

Current fuel cell technology requires high purity hydrogen for successful operation. The government has directed that fuel cell vehicles rely on stationary hydrogen dispensing stations for fueling, yet there is no established infrastructure for hydrogen distribution. Furthermore, many technical difficulties have been encountered during attempts to develop an on-board hydrogen generation system for other mobile applications. As a result, a need exists for a simple, lightweight and compact hydrogen generation system and process that may be used either on-board a mobile vehicle or in a stationary facility.

DETAILED DESCRIPTION OF EMBODIMENTS

In a preferred embodiment, the invention uses a supercritical process and a reactor for processing a mixture of supercritical water and a hydrocarbon fuel to generate hydrogen. Separation of the generated hydrogen is preferably accomplished in the reactor by a membrane, such as palladium, vanadium, copper or alloys thereof (an alloy is a homogenous mixture of two or more elements at least one of which is a metal and the resulting material has metallic properties) or a polymer. In an alternative embodiment of the invention the separation may be performed by a separator device separate from the reactor which may use either a membrane or a pressure swing adsorption (PSA) process for the hydrogen collection.

Figure 1:
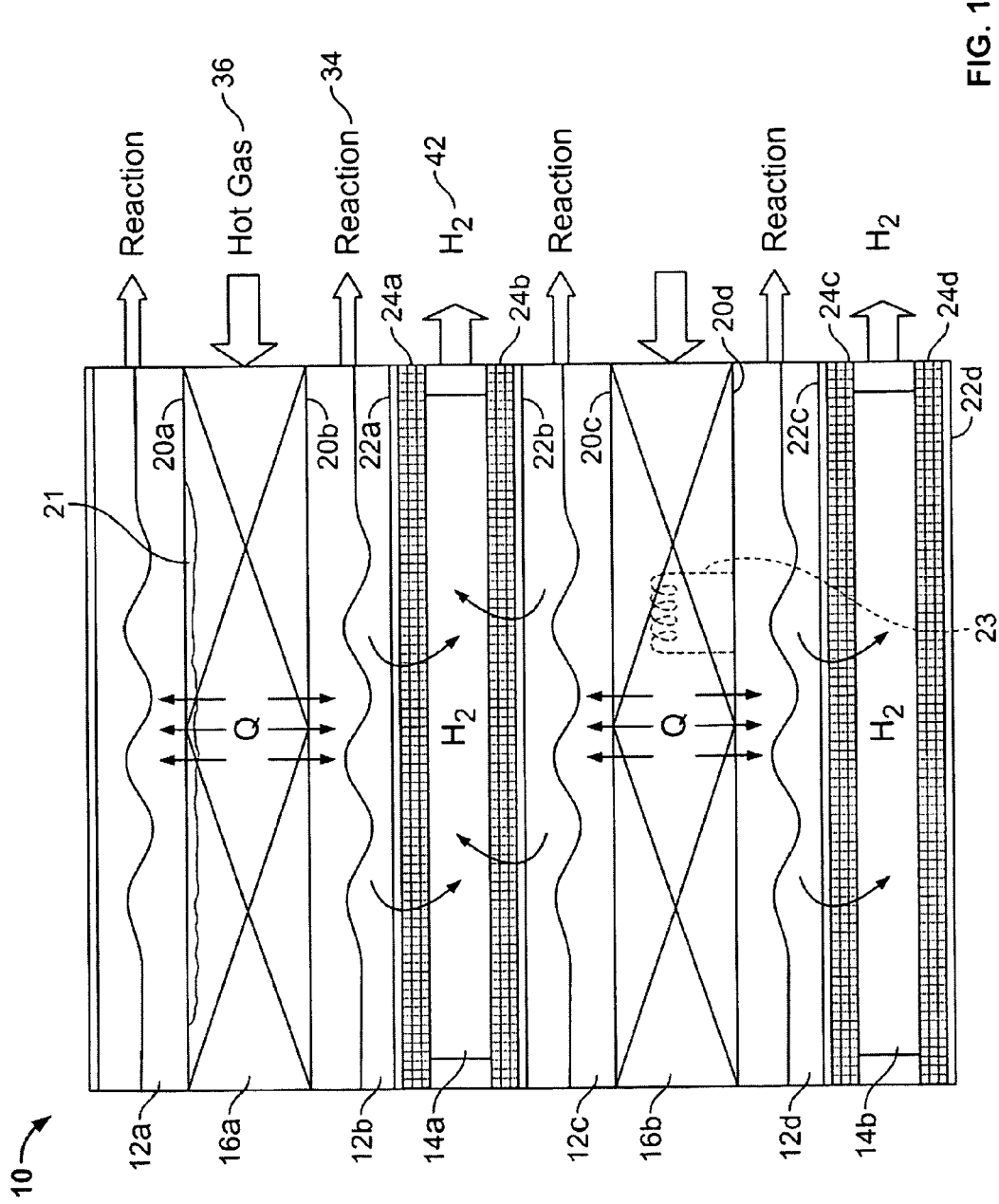
FIG. 1 is a schematic illustrating the interior of a compact reactor in an embodiment of the present invention.

A schematic view of a portion of an embodiment of the reactor of the invention is indicated in general at 10 in FIG. 1. As illustrated in FIG. 1, the reactor features a number of reaction channels 12a-12d. While four reaction channels are illustrated in FIG. 1, the reactor may have more or may have a lesser number of reaction channels or even one reaction channel. Each reaction channel is bounded on one side by a hydrogen channel, 14a and 14b, and on the other side by a combustion or heating stream channel, 16a and 16b. Each reaction channel and heating stream channel are separated by a heat transfer sheet 20a-20d, preferably constructed of metal, upon which a dehydrogenation catalyst, such as nickel, platinum, ruthenium, rhodium, copper or other noble metal or alloys thereof, is coated on the reaction side. Each reaction channel and hydrogen channel are separated by a membrane containing palladium, vanadium or a polymer 22a-22d mounted on a porous support plate 24a-24d on the reaction side.

The heating stream channel may provide heat to the reaction channel by heat transfer from a hot gas stream flowing through the heating stream channel. Alternatively, as will be explained in greater detail below, combustion catalysts may be optionally packed or coated in the heating stream channel, as illustrated at 21 in FIG. 1 for heating stream channel 16a, so that a combustion reaction occurs in the heating stream channel. The heat produced by the combustion reaction heats the reaction channel. A third option is to heat a fluid flowing through the heating stream channel by placing an auxiliary electric heating arrangement in the heating stream channel, such as the resistance element illustrated in phantom at 23 in FIG. 1 for heating stream channel 16*b*.

A reaction stream passes through each reaction channel where the coated catalysts are used. The reaction stream inlet portion for the reactor consist of a mixture of supercritical water and a hydrocarbon fuel. The critical point for water is a temperature of 374° C. at a pressure of 221 bars, which is therefore the minimum temperature and pressure for the reaction stream inlet portion. On the other side of each reaction channel the membrane, supported by the porous material, is applied to extract hydrogen from the reaction stream. The hydrogen generated in each reaction channel permeates through the membrane and then is collected in one of the hydrogen channels at the other side of the membrane. Membranes containing palladium or vanadium have a unique property of exclusively allowing hydrogen to permeate through their structures while other gases have molecules that are too large to pass through the membrane. High purity hydrogen can be collected on the other side of the membrane while the other gases are recycled or collected separately after the reaction from the outlet of the reaction channels.

As illustrated in FIG. 1, a heating stream, which may include steam, inert gas or liquid, flows through each heating stream channel and provides heat (Q) to the reaction channels for the supercritical process. If a combustion catalyst is coated, packed or otherwise present in the heating stream channel, a mixture of air or oxygen mixed with a hydrocarbon may serve as the heating stream inlet so that combustion occurs in the heating stream channel and provides the heat Q to the reaction channels.

Figure 2:
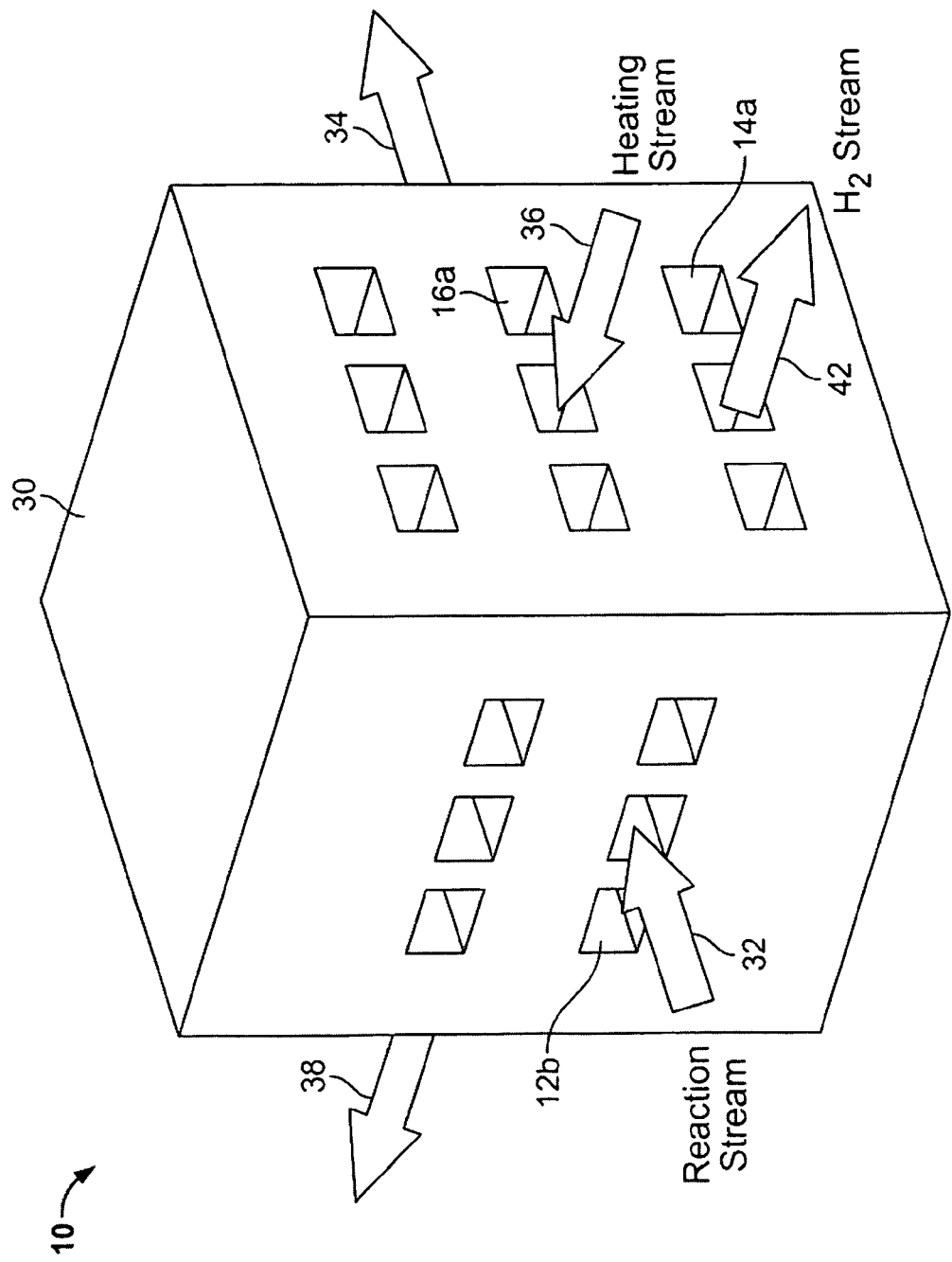
FIG. 2 is a schematic illustrating a portion of the exterior of the compact reactor of FIG. 1.

A simplified illustration of a portion of the exterior of the reactor 10 of FIG. 1 without pipes, headers or manifolds is illustrated in FIG. 2. The reactor features a housing 30 which contains the heating stream channel 16*a*, reaction channel 12*b* and hydrogen channel 14*a* (in addition to the other channels of the reactor, including those illustrated in FIG. 1). While the heating stream, hydrogen and reaction channels are illustrated schematically in FIG. 1 as running in parallel for ease of explanation, the heating stream and hydrogen channels may run perpendicular to, or at any other angle with respect to, the reaction channels. In the embodiment of FIG. 2, the supercritical inlet and outlet portions of the reaction stream are indicated at 32 and 34, respectively (see also FIG. 1 for 34). The inlet and outlet portions of the heating stream are indicated at 36 and 38, respectively (see also FIG. 1 for 36). The hydrogen outlet stream is indicated at 42 in both FIGS. 1 and 2.

For the situation where combustion catalysts are present in the heating stream channels of the reactor 30, the reaction stream outlet 34 may serve as the heating stream inlet 36, since the reaction stream outlet contains a residual hydrocarbon, or outlet stream after fuel cells contains residual hydrogen.

Suitable reactors for use as the reactor of FIGS. 1 and 2 are known in the art. An example of such a reactor is Chart Industries, Inc.'s SHIMTEC® reactor, which is described in U.S. Pat. Nos. 6,510,894 and 6,695,044, the contents of which are incorporated herein by reference. This compact heat exchange reactor has the capability to perform at the high temperature and high pressure required for a process using supercritical water. Moreover, it provides abundant surface area for heat exchange in order to control reaction temperature for increasing the hydrogen production and also abundant membrane surface area for greater hydrogen production in a small device.

While the embodiment of FIGS. 1 and 2 feature a catalyst that is a coating or an unsupported catalyst, the catalyst can be installed in various alternative forms such as a packed bed catalyst having either a supported or an unsupported catalyst, a wash coated catalyst or incipient wetness impregnated catalyst producing a thin film on one or more walls of the reaction chamber or an electroless plated catalyst. The catalyst can be from a range of metals including, but not limited to nickel, platinum, ruthenium, rhodium, copper or alloys thereof. The catalyst is used to break the carbon-carbon bonds and carbon-hydrogen bonds in the reaction stream.

Figure 3:
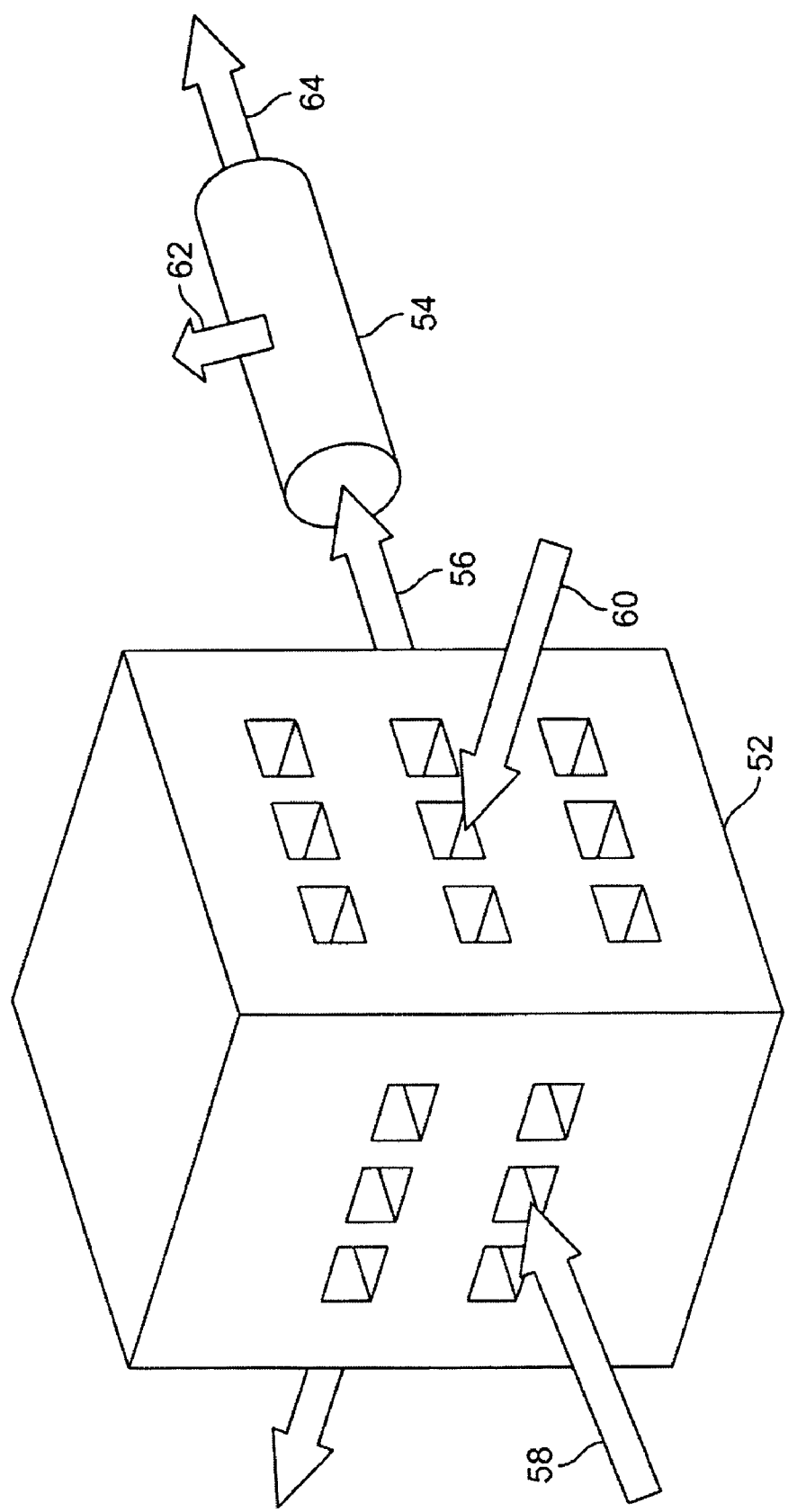
FIG. 3 is a schematic illustrating a compact reactor and a separator in a second embodiment of the present invention.

While FIGS. 1 and 2 illustrate a compact reactor within which hydrogen may be removed from the reaction stream, the removal of hydrogen from the reaction stream may alternatively be accomplished outside of the reactor. The process of separating hydrogen from a stream outside of a reactor is well known and devices are commercially available. For example, as illustrated in FIG. 3, the reaction and separation might be done in two separate devices 52 and 54 connected by a passageway, such as a tube, pipe or conduit to simplify the reactor construction. In such an arrangement, the first device 52 may be a compact reactor, such as the one illustrated in, and described with reference to, FIGS. 1 and 2, but without the membranes 22*a*-22*d* and porous plates 24*a*-24*d* (FIG. 1) and the hydrogen channels. The reactor 52 is used in a supercritical condition for hydrogen generation while the separator device 54 is used for hydrogen separation from the product stream 56 exiting the first reactor through the passageway connecting the reactor and separator. As with the embodiment of FIGS. 1 and 2, the reaction stream input portion 58 and heating stream channel for the reactor 52 may have temperatures above 374° C. and pressures above 221 bars.

The conditions for the separator 54 depend on the membrane and support materials within the device. For example, if the separator 54 features channels divided by porous metal coated with palladium, as illustrated at 22*a*-22*d* and 24*a*-24*d* of FIG. 1, operating temperature could be below 374° C., and operating pressure could be below 221 bars for hydrogen separation. The hydrogen stream exiting the separator 54 is illustrated at 62 in FIG. 3, while the residual stream (which corresponds to the reaction stream outlet portion 34 in FIG. 2) is illustrated at 64.

In an alternative embodiment of the invention, a process swing adsorption (PSA) process may be used by the separator 54 instead of a membrane to separate hydrogen from the product stream 56. The construction of PSA devices is well known in the art. The PSA device 54 separates the hydrogen from the product stream gas 56 under pressure according to the hydrogen's molecular characteristics and affinity for an adsorbent material. The device cycles are to first adsorp hydrogen on the adsorptive material at high pressure and then desorp the hydrogen by lowering the pressure. Hydrogen collection occurs during the low pressure cycle. Using two adsorbent vessels allows near-continuous production of hydrogen. It also permits pressure equalization, where the gas leaving the vessel being depressurized is used to partially pressurize the second vessel. This results in significant energy savings and is a common industrial practice.

As with the embodiment of FIGS. 1 and 2, for the situation where combustion catalysts are present in the heating stream channels of the reactor 52, the residual stream 64 may serve as the heating stream inlet 60, since the residual stream contains a hydrocarbon (as well as residual hydrogen).

Figure 4:
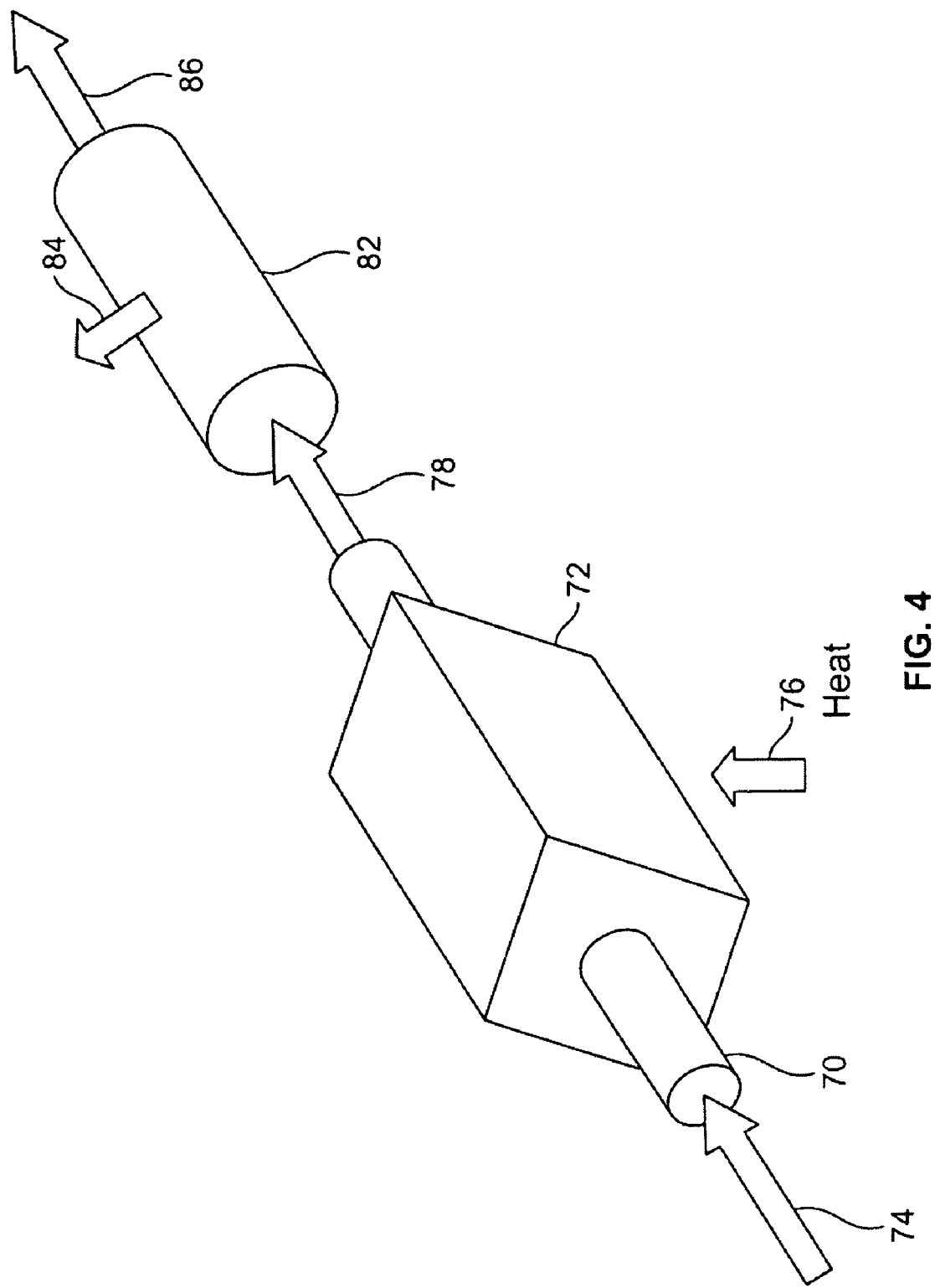
FIG. 4 is a schematic illustrating a tube or channel reactor, a chamber and a separator in a third embodiment of the present invention.

As an alternative to the compact reactor 52 of FIG. 3, a tube or channel reactor 70 could be used, as illustrated in FIG. 4. The tube reactor 70 is placed in a housing 72 that defines an interior chamber. The tube reactor serves as the reaction channel and therefore features a catalyst coating on its interior surfaces or is packed with a catalyst and receives a reaction stream inlet 74. The chamber of housing 72 receives a heating stream 76 whereby heat is provided to the reaction channel in the tube reactor 70. As with the embodiment of FIG. 3, the product stream 78 from the reactor flows through a passageway, such as a tube, pipe or conduit to the separator 82. As with the embodiment of FIG. 3, a hydrogen stream exits the separator 82, as illustrated at 84, while the residual stream (which corresponds to the reaction stream outlet portion 34 in FIG. 2) exits the separator as illustrated at 86. As with the embodiment of FIG. 3, the separator 82 may used either a membrane for the hydrogen separation or a PSA process.

Similar to the embodiments of FIGS. 1-3, for the situation where combustion catalysts are present within the chamber of housing 72, the residual stream 86 may serve as the heating stream inlet 76, since the residual stream contains hydrocarbons (as well as residual hydrogen). Under such conditions, combustion occurs in the chamber of housing 72 to provide heat for the reaction channel of the tube reactor 70.

In all of the embodiments of the invention described above, hydrogen production can be increased by changing the operating conditions of the reactor. For example, increasing the inlet pressure of the reaction stream will increase the driving force for the hydrogen separation. As a result, reactors which are capable of sustaining higher pressures, such as the compact reactors of the embodiments of FIGS. 1-3, will favor more hydrogen production.

It should be noted that an equilibrium shift occurs in the reaction stream favoring hydrogen production. More specifically, as the hydrogen concentration decreases in the reaction stream, the reaction shifts to produce more hydrogen. Also, the removal of the reaction product hydrogen lowers the necessary reaction temperature which increases the range of materials acceptable for the reactor. This results in lower cost, better performance and increased ease of manufacture for the reactor.

The embodiments of FIGS. 1-4 offer a number of unique benefits including the generation of high purity hydrogen efficiently and simply and the generation of a potentially valuable byproduct of high pressure $CO_2$ (present in the reaction stream outlet portion 34 of FIG. 2 or product streams 64 and 86 of FIGS. 3 and 4, respectively). In addition to use as the heating stream for the reactor, the high pressure $CO_2$ produced may be used for power plant or petrochemical complex applications.

The reaction stream inlet portions for the reactors of FIGS. 1-4 consist of a mixture of supercritical water and a hydrocarbon fuel. As mentioned previously, the critical point for water is a temperature of 374° C. at a pressure of 221 bars. Water at these conditions or at a higher temperature and/or a greater pressure (supercritical water) has desirable properties including a change in the capacity to dissolve liquid hydrocarbons. The hydrocarbon fuel may be any hydrocarbon-based fuel such as crude oil, liquid fuels such as jet fuel, diesel and gasoline, natural gas, liquid natural gas, coal, coal dust, saw dust, waste wood and/or biomass material. Other short chain (e.g. <C6) hydrocarbons may also be used in the reaction stream with the water. The temperature can be from 374° C. and up and the pressure from 221 bars and up for both the reaction and heating streams.

The supercritical water has the unique feature of high solubility for most organic liquids, powders or gases. Hydrocarbon fuels, not ordinarily soluble in water, become highly soluble in supercritical water thus permitting the possibility of a reaction between the fuel and water on a catalytic metal based surface, such as nickel, platinum, ruthenium, rhodium, copper or alloys thereof. Reaction conversion reaches 100% and the hydrogen yield can exceed 90%, implying the ability to control the selectivity of the reaction. Details can be seen in the following examples.

Two of the most significant benefits from this supercritical process are that additional hydrogen (for example, more than 60%) comes from water when using fossil fuel as a feed, and $CO_2$ production can be cut significantly (for example, in half) with same amount of hydrogen production compared to current fossil fuel combustion systems.

Examples of the process in embodiments of the invention using different fuel sources are described below.

1. Toluene

Toluene as a model liquid hydrocarbon feedstock may be used for the supercritical process. The desired reaction between toluene and water is as follows:

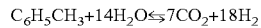

$$C_6H_5CH_3 + 14H_2O \leftrightharpoons 7CO_2 + 18H_2$$

The theoretical yield for this reaction is 39 grams of hydrogen per 100 grams of toluene, or 18 moles of hydrogen per mole of toluene.

Ruthenium on alumina (5 wt. % loading, 100 m²/g-cat surface area) may be used as the catalyst in one embodiment of the reactor. Such a catalyst may be obtained in unreduced form from commercial suppliers. The reaction channels of the reactor are each packed with $Ru/Al_2O_3$ catalyst. Two-micron frits are placed at each end of each reaction channel, thus allowing reactants to freely pass through while the catalyst is retained.

Results from testing the reforming of toluene in supercritical water via $Ru/Al_2O_3$ indicate that residence times on the order of seconds produce a good yield of hydrogen. For example, in a test using a catalytic test reactor consisting of a ¼ in. OD Inconel® tube packed with the catalyst, a 1.9 second reaction time gave a gas mixture of 65.5% $H_2$, 0.9% CO, 5.3% $CH_4$, and 28.3% $CO_2$, with a hydrogen yield of 13.2 and a complete conversion of toluene to gaseous products.

Figure 5:
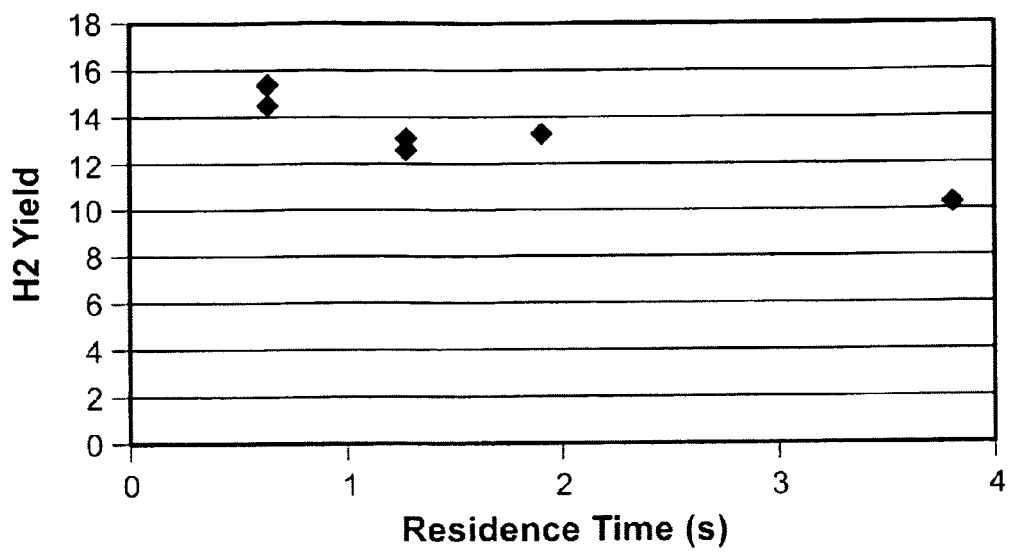
FIG. 5 is a diagram illustrating moles of hydrogen yield per mole of toluene for varying residence time.

Experiments were carried out at different temperatures ranging from 700 to 800° C. using a feed of 2 wt. % gasoline and 98 wt. % water. The test reactor pressure was kept constant at 3500 psi and the residence time in the catalyst was kept at 2 seconds for all the experiments. Effect of temperature is shown in FIG. 5, which shows moles of hydrogen yield per mole of toluene for varying residence time, with $Ru/AL_2O_3$ catalyst, 800° C., 3500 psi, 2.1 wt. % toluene in water, based on calculated equivalent toluene from carbon outlet from the system.

The shorter residence time gives better hydrogen yield suggesting that the reactions are kinetically controlled. The reaction gives a very good yield of hydrogen; it is not too far from the theoretical yield of 18 moles hydrogen per mole of toluene. Further adjustment of the reaction conditions and moving to a compact reactor may improve the yield.

2. Octane

Octane as a model liquid hydrocarbon feedstock may be used for the supercritical process. The desired reaction between toluene and water is as follows:

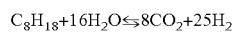

$$C_8H_{18} + 16H_2O \leftrightharpoons 8CO_2 + 25H_2$$

The theoretical yield of this reaction is 26.3 grams of hydrogen per 100 grams of octane, or 25 moles of hydrogen per mole of octane.

The same catalyst $Ru/Al_2O_3$ was used for the reaction in the same test reactor described above for toluene. The experiment was conducted at 750° C. and 3500 psi. The results are shown in Table 1.

TABLE 1

Result when using octane

| Octane Concentration | Composition (mol %) | | | | |
|---|---|---|---|---|---|
| wt. % | H₂ | CO | CH₄ | CO₂ | H₂ yield |
| 2 | 70.1 | 1.1 | 6.1 | 22.7 | 18.6 |
| 4 | 63.8 | 1.6 | 10.4 | 24.1 | 14.4 |

The results indicate that hydrogen can be effectively produced in the supercritical process. The yield reached 70% with complete octane conversion and further adjustment of the reaction conditions and moving to a compact reactor may improve the yield. Increasing the octane concentration in the feed stream reduces the hydrogen yield.

3. Model Gasoline

Gasoline is a mixture of several hydrocarbons comprising paraffins, iso-paraffins, naphthenes (cyclo-paraffin), and aromatic hydrocarbons with traces of sulfur compounds. The presence of sulfur might affect the performance of the catalyst and reduce the hydrogen yield. Hence for the comparative analysis, a sulfur-free gasoline was made by mixing iso-octane, methyl cyclohexane and toluene in the composition shown in Table 2.

TABLE 2

Composition of "sulfur-free" gasoline

| Component | Weight percent | Mole percent |
|---|---|---|
| Iso-octane | 50% | 45.4% |
| Methyl cyclohexane | 20% | 20.6% |
| Toluene | 30% | 34.0% |

All of the above compounds are generally present in gasoline and represent isoparaffin, naphthene and aromatic hydrocarbons.

The desired reaction between these hydrocarbons and water during supercritical reforming is as follows:

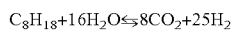

$C_8H_{18} + 16H_2O \rightleftharpoons 8CO_2 + 25H_2$

$C_6H_{11}CH_3 + 14H_2O \rightleftharpoons 7CO_2 + 21H_2$

$C_6H_5CH_3 + 14H_2O \rightleftharpoons 7CO_2 + 18H_2$

Overall reaction:

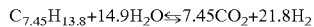

$C_{7.45}H_{13.8} + 14.9H_2O \rightleftharpoons 7.45CO_2 + 21.8H_2$

Hence, each mole of gasoline theoretically can give approximately 21.8 moles of hydrogen. Or 100 grams of gasoline can theoretically produce 43.6 grams of hydrogen. The same catalyst Ru/Al₂O₃ was used for the reaction in the same test reactor described above for toluene.

Figure 6:
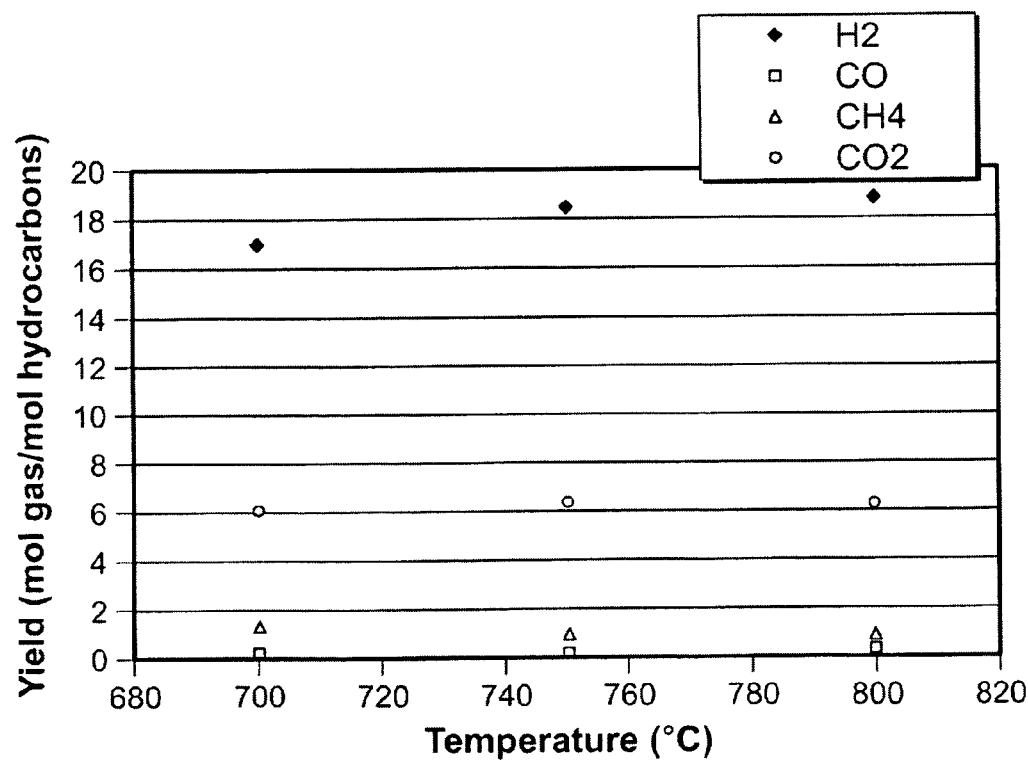
FIG. 6 is a diagram illustrating the effect of temperature on gaseous product yields.

A carbon input/output balance of more than 95 percent was obtained for all of the above runs. Besides CO₂, a small amount of carbon comes out as CO and CH₄, as shown in FIG. 6, which shows the effect of temperature on gaseous product yields, for 2 wt. % gasoline in the feed, reactor pressure of 3500 psi, and 2 second residence time in the Ru/Al₂O₃ catalyst bed. A hydrogen yield of 17 to 19 moles/mole-gasoline was obtained, which suggests near complete conversion of carbon to carbon dioxide. The hydrogen yield increased slightly as the temperature was increased from 700 to 800° C. The details of gaseous product distribution and carbon balance are shown in Table 3.

TABLE 3

Composition of gaseous product from supercritical water reforming of gasoline at 3500 psi, 2 second reaction time in Ru/Al₂O₃ catalyst bed

| T | Gas Composition (mole %) | | | | Gas Yield (moles of product/mole of hydrocarbon fed) | | | |
|---|---|---|---|---|---|---|---|---|
| (° C.) | H₂ | CO | CH₄ | CO₂ | H2 | CO | CH₄ | CO₂ |
| 800 | 72.1 | 0.9 | 3.1 | 23.8 | 18.76 | 0.24 | 0.81 | 6.20 |
| 750 | 71.7 | 0.7 | 3.4 | 24.2 | 18.51 | 0.17 | 0.88 | 6.25 |
| 700 | 69.7 | 0.5 | 5.2 | 24.7 | 17.02 | 0.11 | 1.27 | 6.03 |

Further adjustment of the reaction conditions and moving to a compact reactor may improve the yield.

Figure 7:
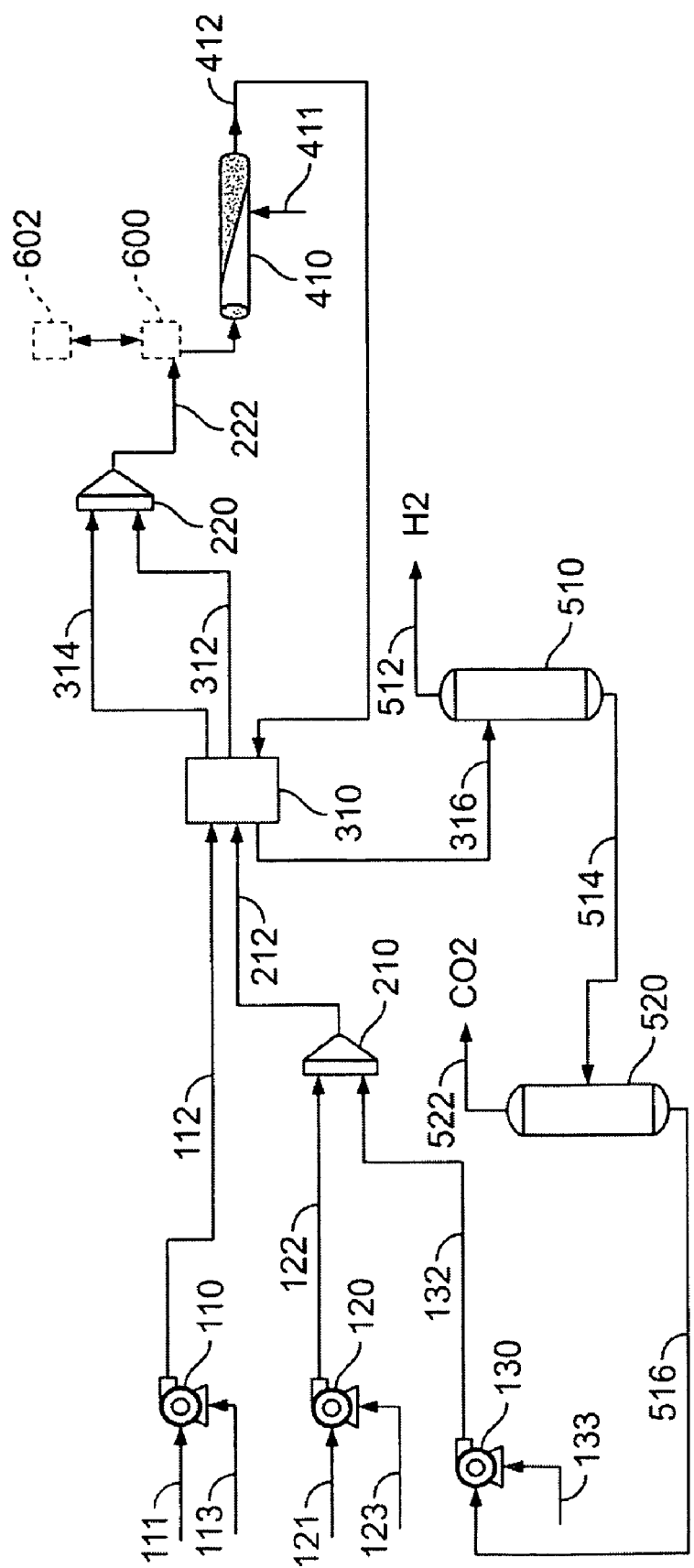
FIG. 7 is a flow diagram illustrating a system for hydrogen production constructed in accordance with the present invention.

A system for producing hydrogen in accordance with the present invention is illustrated in FIG. 7. In the system of FIG. 7, hydrogen separation from the reactor product stream is accomplished outside of the reactor. Liquid hydrocarbon fuel 111 and water 121 are fed into pumps 110 and 120, respectively, to increase the pressure of each from approximately 1 bar to 240 bars. Suitable pumps are known in the art and are available, for example, from Agilent Technologies, Inc. of Santa Clara, Calif. and Milton Roy of Ivyland, Pa. Another water stream from water recycle stream 516 is fed into a pump 130 to increase the pressure to 240 bars and then mixed with fresh water in a mixer 210 to form the stream 212. Both fuel 112 and water 212 streams pass through a heat exchanger 310 to increase the temperature of each to approximately 600~800° C. via heat exchange with reactor product stream 412. Stream 312, supercritical water after the heat exchanger, is mixed with fuel stream 314 in mixer 220 to form a reaction stream 222 input for reactor 410.

The product stream 412 exiting the reactor 410 is directed to the heat exchanger 310 where it heats incoming fuel and water streams 112 and 212, respectively, and then is directed into a hydrogen separator 510. Hydrogen as a product is collected from 510 and is distributed there from, as indicated at 512, for use in fuel cells or hydrogenation. The rest of the stream 514 goes to a gas separator 520 via a pressure release process. All of the product gas except hydrogen is collected in the stream 522 leaving separator 520. A stream of water 516 exits separator 520 and is recycled back to mixer 210 to mix with fresh water via pump 130.

In the flow diagram, energy is imported to the system via streams 113, 123 and 133 to power pumps 110, 120 and 130 and stream 411 to provide the heating stream for reactor 410 (as described with reference to FIGS. 1-4 for combustion in the heating stream channels) through burning residual hydrogen from a fuel cell or hydrocarbon from the gas separator 520.

In addition, a process for fuel desulphurization may optionally be included in the hydrogen generation process of the invention. The purpose of such a process is to remove sulfur compounds which can poison the catalyst in the reactor 410. A supercritical process provides a means of desulphurizing the fuel source as sulfur compounds may be separated due to unique properties achievable under supercritical conditions. More specifically, sulfur inorganic compounds normally are dissolved in water solution, but will form deposits in supercritical condition. In addition, some sulfur organic compounds form suspension in supercritical water condition. Either of these behaviors leads to the possibility of mechanically separating the sulfur from the fuel through the process of forming sulfur compounds which may be physically separated in the separator device, illustrated in phantom at 600 in FIG. 7. The separator device 600 may be, for example, a molecular sieve featuring a zeolite structure. The separator device 600 adsorbs the sulfur contamination as the fuel/reaction stream (222 in FIG. 7) flows through the device. The usual practice is to place two sieves in parallel and alternate between the process flow and regeneration. One sieve, 600 in FIG. 7, is regenerated by desorption while the process flow goes through the other sieve 602.

The supercritical process and reactor described above work well over a wide range of conditions and with various hydrocarbon fuel sources having a wide range of purities. In addition, the ratio of hydrogen fuel produced to the amount of $CO_2$ generated is much higher than if hydrocarbon fuel were burned by itself and the energy cost to operate the reactor and system is low for the amount of energy produced. The residence time for the reaction process is shortened due to the large heat exchange and separation surface areas provided in the reactor, which also facilitate the separation of hydrogen in the reactor.

While embodiments of the invention have been shown and described, it will be apparent to those skilled in the art that changes and modifications may be made therein without departing from the spirit of the invention.

What is claimed is:

1. A reactor for producing hydrogen comprising:
   a) a housing including a bonded stack of plates featuring internal passageways which define a heating stream channel, a hydrogen channel and a reaction channel;
   b) a heat transfer wall separating the heating stream channel and the reaction channel;
   c) a separator positioned between the reaction channel and the hydrogen channel;
   d) said heating stream channel adapted to receive a heating stream so that heat is provided to the reaction channel through the heat transfer wall; and
   e) a catalyst positioned in the reaction channel and said reaction channel adapted to receive a reaction stream including a mixture of supercritical water and a hydrocarbon fuel so that hydrogen is produced in the reaction channel and passes through the separator into said hydrogen channel.

2. The reactor of claim 1 wherein the catalyst includes a coating on the heat transfer wall.

3. The reactor of claim 1 wherein the catalyst is a packed bed catalyst.

4. The reactor of claim 3 wherein the catalyst is a supported catalyst.

5. The reactor of claim 3 wherein the catalyst is an unsupported catalyst.

6. The reactor of claim 1 wherein the reaction channel is perpendicular to the heating stream channel and the hydrogen channel.

7. The reactor of claim 1 wherein the separator includes a membrane mounted on a side of a porous plate so that it is positioned in the reaction channel.

8. The reactor of claim 1 wherein the separator includes a membrane.

9. The reactor of claim 1 wherein the hydrocarbon fuel is a gas selected from the group consisting of natural gas, components of natural gas and other gaseous hydrocarbons.

10. The reactor of claim 1 wherein the hydrocarbon fuel is a liquid selected from the group consisting of gasoline, jet fuel, diesel fuel, crude oil and other liquid fuels.

11. The reactor of claim 1 wherein the hydrocarbon fuel is a solid selected from the group consisting of coal and biomass.

12. The reactor of claim 1 wherein the catalyst is selected from the group consisting of nickel, platinum, ruthenium, rhodium, copper and alloys thereof.

13. The reactor of claim 1 wherein said heating stream channel contains a combustion catalyst so that combustion occurs therein when the heating stream is received.

14. The reactor of claim 1 wherein the heating stream channel includes an auxiliary electric heating arrangement.

15. The reactor of claim 1 wherein the stack of plates of the housing are bonded by brazing.

16. The reactor of claim 1 wherein the stack of plates of the housing are bonded by diffusion bonding.

17. The reactor of claim 1 further comprising a second reaction channel and a second heat transfer wall, said second heat transfer wall separating said second reaction channel from said heating stream channel.

18. The reactor of claim 1 further comprising a second reaction channel and a second separator, said second separator positioned between the second reaction channel and said hydrogen channel.

19. The reactor of claim 1 further comprising a second reaction channel, said heat transfer wall also separating the heating stream channel and the second reaction channel.

20. The reactor of claim 1 further comprising a second reaction channel, said separator also positioned between the second reaction channel and the hydrogen channel.

21. The reactor of claim 8 wherein the membrane is selected from the group consisting of palladium, vanadium, copper and alloys thereof.

22. The reactor of claim 8 wherein the separator includes a porous plate upon which the membrane is mounted.

23. The reactor of claim 1, further comprising a separator device for separating sulfur from the reaction stream.

24. The reactor of claim 23, wherein the separator device comprises a molecular sieve.

* * * * *